United States Patent [19]

Graham

[11] Patent Number: 4,752,940
[45] Date of Patent: Jun. 21, 1988

[54] METHOD AND APPARATUS FOR TRANSMISSION OF DIGITAL DATA OVER A LINE

[75] Inventor: Martin H. Graham, Berkeley, Calif.

[73] Assignee: And Yet, Inc., Berkeley, Calif.

[21] Appl. No.: 889,860

[22] Filed: Jul. 28, 1986

[51] Int. Cl.⁴ .............................................. H04B 3/10
[52] U.S. Cl. ........................................ 375/10; 371/22; 370/111
[58] Field of Search .................... 370/13, 17, 102, 111; 375/10, 112; 455/67; 379/1, 8, 10, 22, 24, 28; 324/57 PS, 58 R, 58 A; 371/22

[56] References Cited

U.S. PATENT DOCUMENTS

| | | | |
|---|---|---|---|
| 3,217,258 | 11/1965 | Arlin et al. | 375/10 |
| 4,025,854 | 5/1977 | Oades | 455/67 |
| 4,072,987 | 2/1978 | Walker | 375/112 |
| 4,330,858 | 5/1982 | Choquet | 370/111 |
| 4,633,464 | 12/1986 | Anderson | 370/111 |

*Primary Examiner*—Benedict V. Safourek
*Attorney, Agent, or Firm*—Blakely, Sokoloff, Taylor & Zafman

[57] ABSTRACT

A method and apparatus for transmitting data over a line where the data is received for transmission at a fixed rate. The data is buffered and transmitted over the line at a rate faster than the fixed rate to create "dead" times used for calibration. Calibration signals are transmitted over the line during the dead time to determine the characteristics of the line.

7 Claims, 1 Drawing Sheet

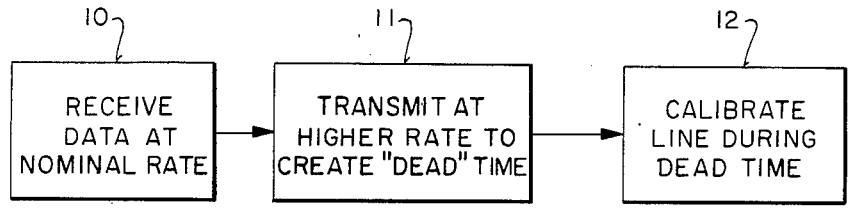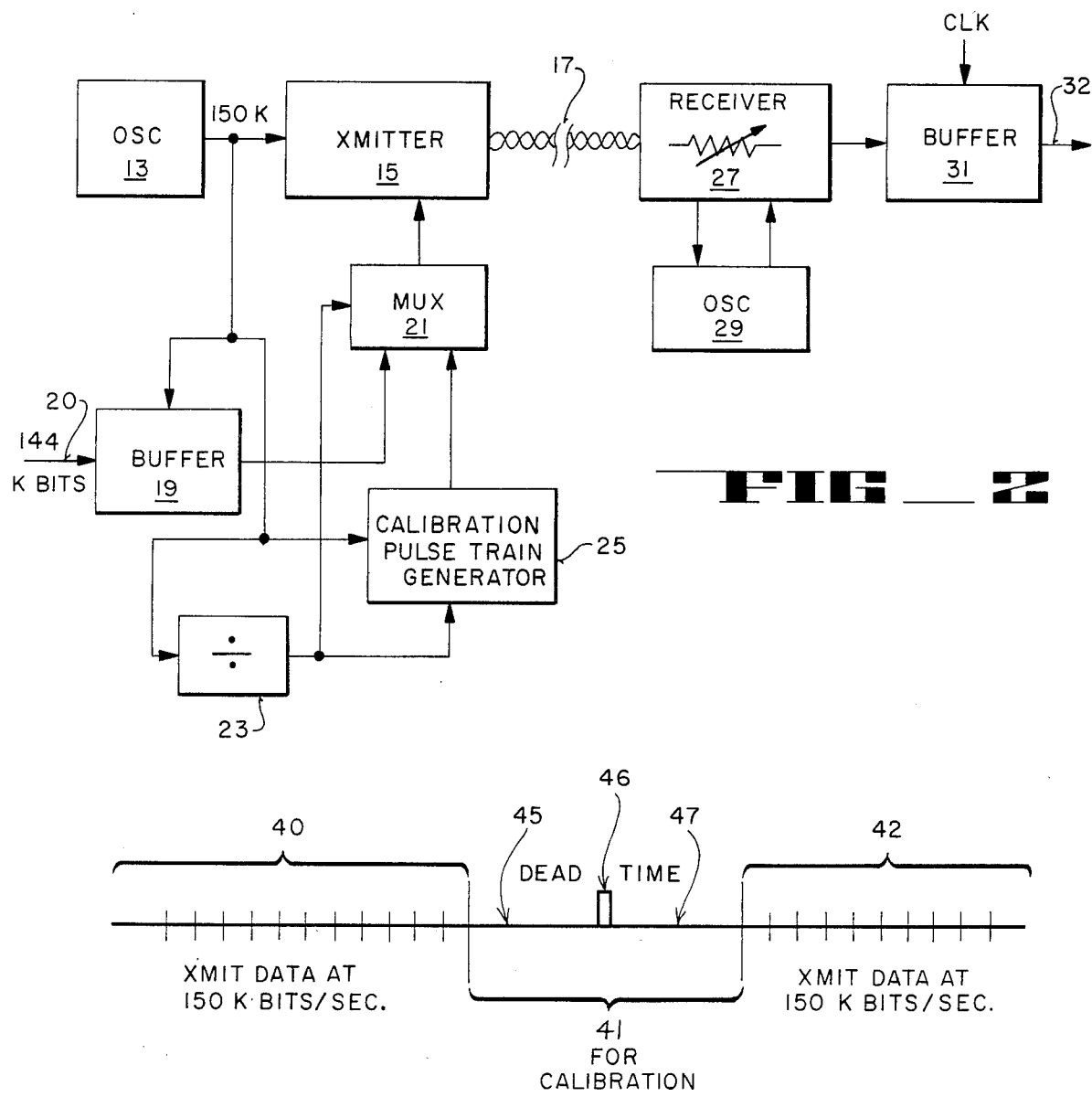

METHOD AND APPARATUS FOR TRANSMISSION OF DIGITAL DATA OVER A LINE

BACKGROUND OF THE INVENTION

1. Field of the Invention.

The invention relates to the transmission of data in digital form over lines.

2. Prior Art.

Frequently, digital data is transmitted over lines at a fixed rate. Numerous standard formats are used for this transmission such as the so-called "T1" format where data is transmitted at a rate of 144K bits per second.

The receiver must synchronize itself with the rate at which the data is received in order to properly sense the data. Often, the line and related input parameters are first examined to determine electrical characteristics. This allows the receiver to adjust its characteristics such as the frequency at which it receives data and the phase of this frequency, and to compensate for the delay inherent in the line and the frequency versus attenuation characteristics of the line. It also allows the adjustment of hybrid circuits for balance.

Typically, however, the characteristics of the line vary, albeit slowly. This slow variation is most often found in lines without repeaters, although it can occur in lines with stable repeaters. This variation can be due to atmospheric conditions such as temperature, wind, or moisture.

There are several methods and apparatuses for reexamining the characteristics of the line and related input parameters while the data is being transmitted. These are generally quite complex and involve mathematically derived solutions which are based on certain assumptions such as the randomness of the data. In other cases, adjustments are made to achieve the lowest error rate which is also complex.

As will be seen, the present invention provides a relatively simple method and apparatus for permitting the transmission of the data and the examination of the characteristics of the line and related input characteristics.

SUMMARY OF THE INVENTION

The method of the present invention comprises the receiving of data at a nominal rate (e.g., 144K bits per second), and buffering it prior to transmission over the line. The data is transmitted over the line at a higher rate (e.g., 150K bits per second). By transmitting the data at a higher rate "dead" times are created, that is, times when data need not be transmitted. During these dead times calibration signals are transmitted over the line permitting the receiver to determine the characteristics of the line and adjust itself. Since the calibration signals are not included within data, relatively simple known means may be used to examine the calibration signals and adjust the characteristics of the receiver.

BRIEF DESCRIPTION OF THE DRAWINGS

FIG. 1 is a block diagram showing the method of the present invention.

FIG. 2 is a block diagram illustrating the apparatus of the present invention.

FIG. 3 is a timing diagram used to describe the operation of the method of FIG. 1 and apparatus of FIG. 2.

DETAILED DESCRIPTION OF THE PRESENT INVENTION

A method and apparatus is described for transmitting data over a line where the characteristics of the line and related input characteristics are separately determined. In the following description, specific details are set forth such as specific transmission rates in order to provide a thorough understanding of the present invention. It will be obvious, however, to one skilled in the art that these specific details need not be used to practice the present invention. In other instances, well-known circuits have not been set forth in detail in order not to unnecessarily obscure the present invention.

Referring to FIG. 1, the method of the present invention is shown with the steps 10, 11 and 12. Assume that data is received at a nominal rate, for instance, a rate which is fixed by a transmission standard such as "T1". For this particular standard, the data is received at a rate of 144K bits per second from, for instance, a modem or other device. Assume further that it is necessary to transmit the data over a line such as a twisted pair, coaxial cable or other line. The receiver at the other end of the line must be synchronized to receive the data and the balancing of the hybrids. Moreover, the characteristics of the line itself are important since they affect the ability of the receiver to receive the data. As mentioned in the prior art section, typically synchronization signals or equivalent signals are transmitted with the data and this permits the receiver to determine such things as the rate of transmission and the characteristics of the line.

With the present invention, as shown by step 11, the data is transmitted at a higher rate over the line thereby creating "dead" times. The calibration periods are periods during which data need not be transmitted since the data is transmitted at a faster rate than the nominal rate. Again, by way of example, if the nominal data rate is 144K bits per second, transmission over the line can occur at 150K bits per second, thereby creating the dead times. Generally, data is buffered and transmitted in blocks to provide periodic blocks of dead time. As shown by step 12, during the dead times, calibration signals are sent over the line, allowing the receiver to be synchronized and to determine the characteristics of the line and related input characteristics used, for instance, by adaptive hybrids (e.g., echo cancellors).

Referring to FIG. 3, data is shown being transmitted during a period 40 at a rate of 150K bits per second. This rate is higher than the nominal rate for the example used above of 144K bits per second. This faster transmission provides the dead time 41. During the dead time 41, a calibration pulse or pulses are transmitted such as shown by pulse 46. Following the dead time, data is again transmitted at the faster rate of 150K bits per second as shown by the period 42.

Referring to FIG. 2, the apparatus of the present invention is shown with its object being the transmission of data over the line 17. This line, as mentioned above, may be a twisted pair, coaxial cable or other line. Assume that the characteristics of this line change slowly with respect to time.

The data to be transmitted over the line 17 is received on the line 20. For the example illustrated, assume the data is received at the buffer 19 at a rate of 144K bits per second. The data is temporarily stored within the buffer 19 and transmitted in blocks. For the described example, if 10 calibration periods are to be employed each second, then the buffer 19 must store approximately 14K bits. This can be done by using a double buffer, each section of which has a capacity of approximately 14K bits. The data from line 20 is read into one section at the 144K bits per second rate, while it is being read out of the other section at the 150K bits per second rate. Alternatively, a first-in-first-out (FIFO) buffer may be used. This alternative has the advantage of requiring less memory and causing less delay.

The transmission over line 17 is driven by transmitter 15 which receives the data from the buffer 19 through the multiplexer 21. The rate of transmission is controlled by the oscillator 13 and for the example discussed above, a 150 kHz signal is coupled to the transmitter 15 and buffer 19. Ordinary transmission means can be employed for driving this signal over the lines 17. The signal from the oscillator 13 is coupled to a dividier 23 to provide the periodic dead times 41 shown in FIG. 3. When these dead times occur, the multiplexer 21 deselects the buffer 17 and selects the calibration pulse train from the generator 25. This signal is then transmitted through the transmitter 15 over lines 17.

The receiver 27 is coupled to the other end of the line 17 and receives the data at the 150K bits per second rate. The oscillator 29 is synchronized with the data rate by the pulse received during the calibration period 41. Additionally, the receiver 27 adjusts its characteristics to optimize the receiving of the signal over the line 17, for instance, in a bridge network (hybrid) parameters in the bridge are changed to match the changing impedance of the line 17. Well-known circuitry can be used, both for the receiver 27 and oscillator 29.

The output of the receiver 27 is shown coupled to a buffer 31. The buffer 31 may be similar to the buffer 19 in that the data may be read from the buffer 31 onto line 32 at the 144 kilobits rate under control of a clocking signal.

The data is read from the buffer 31 at the higher rate.

In the currently preferred embodiment, the calibration signal comprises a plurality of zeros 45, followed by one or more calibration pulses such as pulse 46, and then followed by additional zeros 47. (A series of different pulse patterns an also be used.) The number of zeros 45 is set to permit all transients from the transmitter 15 to die out in the line 17 before the pulse or pulses 46 are transmitted. This allows the receiver 27 since the number of zeros 45 are known, to determine such parameters such as the delay in the line, the frequency response or the frequency and phase associated with oscillator 13.

In the above discussion the interval 41 is used for calibration for the transmission of data from transmitter 15 (over line 17) to receiver 27. In a duplex system, the interval 41 can also be used for determining the input and transmission characteristics in the other direction.

Thus, a transmission and method apparatus has been described which permits relatively simple circuitry to be used for determining the characteristics of the line. The simple circuitry is possible since the calibration signals are not embedded within the data, but rather, transmitted separately in a clear field.

I claim:

1. A method for transmitting data over a line comprising the steps of:
   receiving the data in a buffer at a first rate;
   transmitting the data received by said buffer over said line at a second rate which is faster than said first rate so as to create periods of time during which data need not be transmitted;
   receiving said data from said line in a receiver at said second rate;
   transmitting calibration signals over said line during said periods of time;
   determining the characteristics of said line from received calibration signals;
   adjusting the characteristics of said receiver based on said received calibration signals;
   buffering the data received by said receiver such that the data is received at said second rate and outputted at said first rate;
   whereby the characteristics of said line can be determined when data is not being transmitted over said line.

2. The method defined by claim 1 wherein said periods of time are of fixed duration and occur periodically.

3. The method defined by claim 2 wherein said calibration signals comprise a plurality of zeros followed by at least one pulse.

4. The method defined by claim 3 wherein the duration of said plurality of zeroes is sufficiently long to permit transients from said transmission of data in said line to subside.

5. An apparatus for transmitting data over a line comprising:
   first buffering means for receiving data at a first rate;
   transmitting means coupled to said first buffering means and said line for generating a timing signal corresponding to a second rate which is faster than said first rate and for transmitting said data received at said first rate by said buffering means over said line at said second rate said data being coupled from said buffering means to said transmission means at said second rate thereby creating periods of time when data is not being transmitted;
   calibration signal generation means for generating calibration signals coupled to said transmitting means to provide transmission of calibration signals over said line during said periods of time when data is not being transmitted over said line by said transmitting means;
   receiving means coupled to said line for receiving data from said line, said receiving means adjusting its receiving characteristics based on said calibration signals received over said line;
   second buffering means for receiving data from said receiving means at said second rate and for providing data at said first rate;
   whereby the characteristics of said line are readily determined from said calibration signals transmitted during said periods when data is not being transmitted over said line.

6. The apparatus defined by claim 5 wherein said receiving means includes an oscillator and the frequency of said oscillator is adjusted based on said calibration signals to match said second rate.

7. The apparatus defined by claim 5 wherein said calibrating signal generation means generates a calibration signal which comprises a plurality of zeros followed by at least one pulse.

* * * * *